United States Patent [19]

Falla et al.

[11] Patent Number: 4,946,616

[45] Date of Patent: Aug. 7, 1990

[54] HEAT TRANSFER FLUIDS CONTAINING DICARBOXYLIC ACID MIXTURES AS CORROSION INHIBITORS

[75] Inventors: Daniel J. Falla, Sarnia, Canada; Peter H. Berchtold, Horgen, Switzerland

[73] Assignee: The Dow Chemical Company, Midland, Mich.

[21] Appl. No.: 270,718

[22] Filed: Nov. 14, 1988

[51] Int. Cl.$^5$ ............................................. C09K 5/00
[52] U.S. Cl. ..................................... 252/75; 252/73; 252/76; 252/77; 252/79; 252/394; 252/396
[58] Field of Search ........................ 252/79, 76, 75, 73, 252/77, 396, 394

[56] References Cited

U.S. PATENT DOCUMENTS

| | | | |
|---|---|---|---|
| 2,726,215 | 12/1955 | Jones | 252/389 |
| 4,448,702 | 5/1984 | Kaes | 252/70 |
| 4,578,205 | 3/1986 | Yeakey et al. | 252/76 |
| 4,584,119 | 4/1986 | Duranleau et al. | 252/75 |
| 4,592,853 | 6/1986 | Darden et al. | 252/75 |
| 4,647,392 | 3/1987 | Darden et al. | 252/75 |

FOREIGN PATENT DOCUMENTS 1142744  3/1983  Canada .

OTHER PUBLICATIONS

Engine Coolant Testing: State of the Art, ASTM STP 705, W. H. Ailor, Ed., American Society for Testing and Materials, 1980, pp. 295-309.

G. Butler et al., "Inhibitor Formulations for Engine Coolants", Br. Corros. J., 1977, vol. 12, No. 3, pp. 171-174.

E. W. Beale et al., "Evaluation of a Novel Engine Coolant Based on Ethanediol Developed to Replace AL-3 (NATO S735) as the Automotive Antifreeze used by the British Army".

Primary Examiner—Paul Lieberman
Assistant Examiner—Christine A. Skane
Attorney, Agent, or Firm—Paula Sanders Ruhr

[57] ABSTRACT

A coolant composition for use in automotive engines is disclosed which comprises a liquid alcohol freezing depressant and a corrosion inhibitor consisting essentially of decanedioic acid, dodecanedioic acid and sodium tolyltriazole.

8 Claims, No Drawings

HEAT TRANSFER FLUIDS CONTAINING DICARBOXYLIC ACID MIXTURES AS CORROSION INHIBITORS

BACKGROUND OF THE INVENTION

The current invention concerns corrosion inhibitors useful in heat transfer fluids. More particularly, this invention concerns metal corrosion inhibition in heat transfer fluids such as coolants useful in automobile engines.

Automobile engine cooling systems contain a variety of metals, including copper, solder, brass, steel, cast iron, aluminum andd their alloys. The possibility of corrosive attack on these metals in automobile engines is high due to the presence of various ions as well as the high tempertures, pressures and flowrates found in the cooling systems of modern engines. The presence of corrosion products in the cooling system can and does interfere with the heat transfer from the combustion chambers which subsequently may cause overheating and engine component failure due to the excessive metal temperatures.

It would thus be desirable to prevent or substantially decrease the formation of corrosion products within engine cooling systems. One well-recognized method for accomplishing this goal is the addition of corrosion inhibitors to the coolants typically used in automotive engines. Various inhibitors have been identified as useful for this purpose. Examples of such inhibitors include silicates, amines, nitrates, borates, molybdates, and triazoles either alone or in various combinations. For a discussion of the state of the art, see, e.g., U.S. Pat. No. 4,647,392 hereby incorporated by reference which discusses various inhibitor compositions.

Various problems exist with known inhibitors. These problems include toxicity and environmental concerns, the use of expensive materials and the degradation of the inhibitor composition under actual use conditions. Further, many existing inhibitor compositions have only limited effect in protecting lighter metals such as aluminum currently finding use in automotive engines. Thus, what is needed are coolant compositions which are environmentally acceptable, use readily available and relatively inexpensive materials and are more effective in protecting aluminum engine parts than traditional corrosion inhibitors.

SUMMARY OF THE INVENTION

The present invention is such a coolant composition comprising a major portion of a water-soluble liquid alcohol freezing point depressant or mixture thereof and a corrosion-inhibiting amount of an inhibitor consisting essentially of (1) from about 2.0 to about 5.5 weight parts of a mixture of at least two $C_{7-14}$ dicarboxylic acids or salts thereof per 100 weight parts of the coolant composition and (2) from about 0.05 to about 0.5 weight parts of a hydrocarbyl triazole or salt thereof per 100 weight parts of the coolant composition.

It is surprising that the corrosion inhibitor composition of the present invention results in increased portection against corrosion, particularly of aluminum wihtout the use of nitrates, silicates or expensive or dangerous additives.

DETAILED DESCRIPTION OF ILLUSTRATIVE EMBODIMENTS

Water-soluble liquid alcohol freezing point depressants are useful in the practice of this invention. By liquid, it is meant that the alcohols should be liquid at temperatures in the range of −65° C. to 30° C. and boil at atmospheric pressure at temperatures in the range from about 150° C. to about 230° C. The alcohols are preferably dihydric and include ethylene glycol, diethylene glycol, prolpylene glycol, dipropylene glycol and mixtures thereof. More preferably, the water-soluble liquid alcohol freezing point depressant used in a mixture of ethylene glycol and diethylene glycol.

Dicarboxylic acids useful in the practice of this invention are non-cyclic. Such diacids include heptanedioic acid, octanedioic acid, nonanedioic acid, decanedioic acid, undecanedioic acid, dodecanedioic acid, tridecanedioic acid and tetradecanedioic acid. A mixture consisting of any two or more of these diacids is used in the composition of this invention. The diacids are typically used in the form of their water-soluble salts. Examples of salts useful in the parctice of this invention include the salts of alkali metals and alkaline earth metals. For example, use may be made of the lithium, sodium, potassium or calcium salts of the dicarboxylic acids.

In a particulary preferred embodiment of the invention, a mixture of dodecanedioic acid and decanedioic acid or their water-soluble salts are used in the inhibitor composition of this invention. The weight ratio of dodecanedioic acid to decanedioic acid may range from about 3:1 to about 1:3. It is more preferred that the weight ratio of dodecanedioic acid to decanedioic acid is at least about 1.75:1.0 and no greater than about 2.25:1.0. In the most preferred embodiment, the weight ratio of dodecanedioic acid to decanedioic acid is about 2.0:1.0.

The azole which is suitably used in the practice of this invention is any which is soluble in the dihydric alcohol and is a corrosion inhibitor for copper and brass. Examples of azoles useful in the inhibitor composition of this invention include triazoles such as tolyltriazole, mercaptobenzothiazole and benzotriazole or mixtures thereof. The triazoles are preferably used in the salt form as salts of alkali metals. It is preferred to use tolytriazole in the salt form as sodium tolytriazole. The amount of the triazole or mixture of triazoles useful in the process of this invention is preferably at least about 0.1 weight percent and no greater than about 0.3 weight percent based on the weight of the coolant composition. While the triazole or mixture of triazoles may be used in this invention as a 100 percent solution, it is preferred to use the triazole or mixture of triazoles in the form of a 50 percent solution in water.

In addition to the alcohol freezing point depressant and corrosion inhibitor discussed above, the coolant compositions of this invention may further comprise water and other additives such as anti-foaming agents and pH adjusting agents. The coolant compositions will preferably comprise a basic agent to adjust the pH of the coolant composition to desired range. Examples of useful basic reagents include alkali metal hydroxides. Any amount of an alkali metal hydroxide which is effective to maintain the pH of the coolant between about 6.5 and 9.5, preferably between about 7.0 and 9.0 and most preferably between about 8.0 and 8.5 is useful in the practice of this invention. Examples of alkali metal hydroxides useful in the practice of this invention include lithium, sodium and potassium with sodium hydroxide being preferred.

The coolant compositions of the present invention may be formulated by methods known in the art. Typically, the alcohol freezing point depressant or mixture thereof is added to a vessel with a base such as sodium hydroxide. Next, the first diacid, in water-soluble salt form, is added. The mixture is then heated to aid in dissolving the first salt. Next, the salt of the second diacid is added, the solution is again heated and stirred to aid dissolution of the second diacid. Next, the azole solution is added and the solution is stirred. Finally, appropriate amounts of water to obtain the desired concentration and other additives such as antifoams are added. Additional sodium hydroxide is also added at this time to attain the desired pH.

In a particularly preferred embodiment, the coolant composition will comprise about 90 to 95 weight percent of a 90:10 ratio mixture of ethylene glycol and diethylene glycol; a corrosion inhibitor consisting essentially of about 0.7 weight percent decanedioic acid, 1.8 weight percent dodecanedioic acid and about 0.1 weight percent of sodium tolyltriazole; about 3.0 to 4.0 weight percent water; sufficient sodium hydroxide to maintain the pH of the composition at about 8.3 to about 8.5 and about 10 to 100 parts per million (ppm) silicone glycol antifoam.

The following examples are provided to illustrate the invention and should not be interpreted as limiting it in any way. Unless stated otherwise, all parts and percentages are by weight.

EXAMPLES 1-3 AND C-1

A coolant composition is prepared by mixing the amounts of the following components needed to obtain the percentages listed for the coolant compositions listed in Table I.

The alcohol or mixture of alcohols is placed in a reaction vessel with sodium hydroxide and heated. The salt of one dicarboxylic acid is added and the solution is heated sufficiently so that the salt goes into solution. The salt of the second dicarboxylic acid is added and the solution is heated sufficiently so that the salt goes into solution. The heat is turned down and the salt of the triazole is added and the mixture is stirred. Appropriate amounts of water to obtain the desired concentration are added and sodium hydroxide is added to adjust the pH. A portion of silicone glycol antifoam is also added.

The coolant compositions prepared as described above are tested for corrosion inhibition and the results obtained are given in Table I below.

TABLE I

| Example Number | 1 | 2 | 3 | C-1* |
|---|---|---|---|---|
| Weight Parts: | | | | |
| EG [1] | Balance | Balance | Balance | Balance |
| DEG [2] | 10 | 10 | 10 | 0 |
| DDA [3] | 0.8 | 0.8 | 3.4 | 3.4 |
| DODA [4] | 1.7 | 1.7 | 1.7 | 0 |
| STTA [5] | 0.1 | 0.3 | 0.1 | 0.3 |
| pH | 8.3 | 8.3 | 8.3 | 8.3 |
| Corrosion Inhibition: | | | | |
| wt loss in 336 hours Glassware Corrosion [6], | | | | |
| mg wt loss+ | | | | |
| copper | −4.4 | −3.7 | −4.2 | −4.0 |
| solder | −3.5 | −2.5 | −3.7 | −2.3 |
| brass | −2.7 | −1.9 | −3.3 | −1.2 |
| steel | −0.4 | 0.3 | −0.8 | 0.2 |
| cast iron | −1.9 | 1.5 | −2.0 | 1.5 |
| aluminum | −8.7 | −4.2 | −6.8 | −9.1 |
| Heat Rejecting Aluminum Test [7] | −0.25 | −0.89 | −0.83 | −0.92 |
| mg/cm$^2$/week (25% coolant concentration) | | | | |
| Dynamic Heat Transfer Test [8] | | | | |
| (40% coolant concentration) | | | | |
| metal | | | | |
| copper | −5.37 | — | — | −16.40 |
| solder | −3.90 | — | — | −9.73 |
| brass | −3.70 | — | — | −18.30 |
| steel | −1.00 | — | — | −0.07 |
| cast iron | +0.33 | — | — | +2.60 |
| aluminum | 72.27 | — | — | −143.90++ |
| Simulated Service Circulation Test [9] | | | | |
| Radiator Tube Pitting | 9.5 | — | — | 8 |
| Header Crevice Corrosion | 6.5 | — | — | 4.5 |
| Dynamic Heat Transfer Test [10] | | | | |
| 40% coolant concentration | | | | |
| 20 cm$^2$ plates, mg weight loss | | | | |
| aluminum | | | | |
| bottom plate | 11.7 | — | — | 71 |

TABLE I-continued

| Example Number | 1 | 2 | 3 | C-1* |
|---|---|---|---|---|
| top plate | 1.7 | — | — | 21 |

*Not an example of the invention
+Weight loss in mg is measured using a standard two-inch by one-inch coupon
++Thick sticky layer found on surface of aluminum plate
[1] ethylene glycol
[2] diethylene glycol
[3] decanedioic acid
[4] dodecanedioic acid
[5] sodium tolyltriazole (100% solution)
[6] ASTM D-1384
[7] ASTM D-4340
[8] Dynamic heat transfer test
[9] Simulated service circulation test using a pressurized closed loop circulating system of full size components run to simulate the equivalent of 50,000 miles, Ford Specification WSE-M97B44-B, Section 3.4.2.2
[10] Dynamic heat transfer test, Ford Specification WSE-M97B44-B, Section 3.4.2.1

The data in the above table demonstrates the effectiveness of the corrosion inhibited coolant compositions of the present invention. The preformance of the coolant composition of the invention is generally comparable or better than known compositions as shown by Comparative Example C-1.

What is claimed is:

1. A coolant composition comprising a major portion of one or more water-soluble liquid alcohol freezing point depressants and a corrosion-inhibiting amount of an inhibitor consisting essentially of (1) from about 2.0 to about 5.5 weight parts of a mixture of decanedioic acid and dodecanedioic acid or salts thereof per 100 weight parts of the coolant composition and (2) from about 0.5 to about 0.5 weight parts of a hydrocarbyl triazole or salt thereof per 100 weight parts of the coolant composition.

2. The composition of claim 1 wherein the freezing point depressant consists essentially of a 90:10 ratio mixture of ethylene glycol and diethylene glycol.

3. The composition of claim 2 wherein the mixture of decanedioic acid and dodecanedioic acid consists of about 0.7 weight parts of decanedioic acid and about 1.8 weight parts of dodecanedioic acid.

4. The composition of claim 1 wherein the pH of the composition is at least about 7.0 and no greater than about 9.0.

5. The composition of claim 4 wherein the pH is at least about 8.0 and no greater about 8.5.

6. The process of claim 3 wherein the triazole is sodium tolyltriazole.

7. The process of claim 3 wherein from about 0.1 to about 0.3 weight parts of the triazole are used.

8. The process of claim 7 wherein about 0.1 weight part of the triazole is used.

* * * * *

UNITED STATES PATENT AND TRADEMARK OFFICE
CERTIFICATE OF CORRECTION

PATENT NO. : 4,946,616
DATED : August 7, 1990
INVENTOR(S) : Daniel J. Falla et al.

It is certified that error appears in the above-identified patent and that said Letters Patent is hereby corrected as shown below:

Column 1, line 15 "andd" should correctly read --and--.

Column 1, line 65 "portection" should correctly read --protection--.

Column 1, line 66 "wihtout" should correctly read --without--.

Column 2, line 11 "prolpylene" should correctly read --propylene--.

Column 2, line 13 "in" should correctly read --is--.

Column 4, under the metal section of Table I, in the first Balance column, "72.27" should correctly read -- -72.27--.

Column 5, line 32 "0.5 to about 0.5" should correctly read --0.05 to about 0.5--.

Signed and Sealed this

Second Day of June, 1992

Attest:

DOUGLAS B. COMER

*Attesting Officer*  *Acting Commissioner of Patents and Trademarks*